Dec. 4, 1951     T. CARVEL     2,576,995
AGITATING AND SCRAPING MECHANISM
Filed June 28, 1949
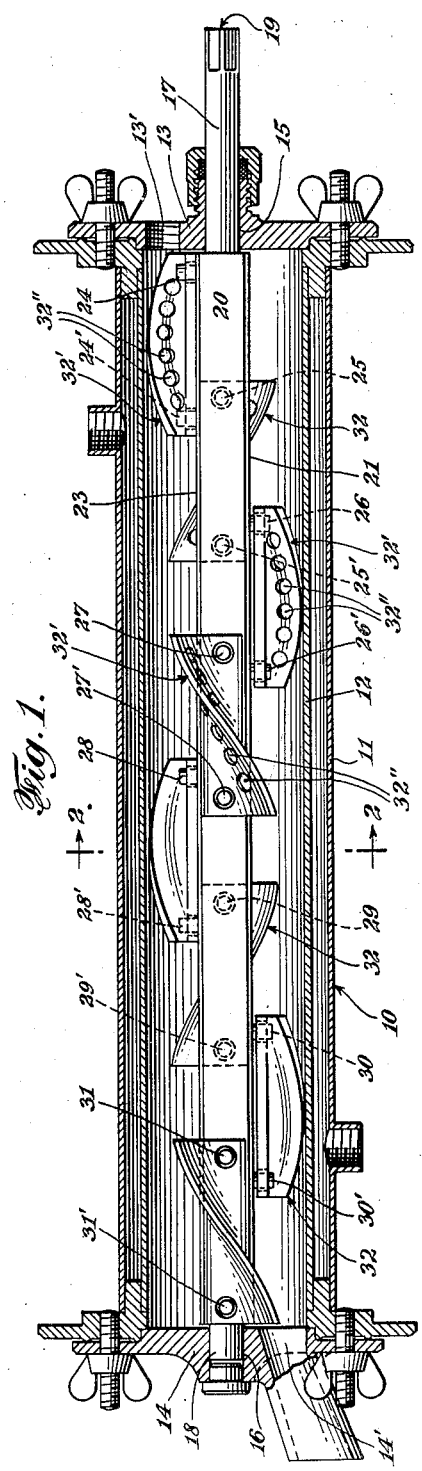
INVENTOR
*Thomas Carvel.*
BY
ATTORNEY Patented Dec. 4, 1951

2,576,995

UNITED STATES PATENT OFFICE 2,576,995

AGITATING AND SCRAPING MECHANISM

Thomas Carvel, Hartsdale, N. Y.

Application June 28, 1949, Serial No. 101,874

22 Claims. (Cl. 259—109)

This invention broadly relates to apparatus for producing and freezing confections, such as ice cream, frozen custard and the like in which is employed what is known as a "chiller" or freezer, often referred to either as freezing cylinder, freezing chamber or barrel, and especially to the agitating mechanism operative within such freezer.

It is well-known in the art of manufacturing ice cream, frozen custard and similar frozen confections that in order to obtain a product in its best form, the temperature of the freezing barrel, and therefore of the confection mix therewithin, must be properly controlled. Furthermore it is essential that such product possess the characteristics of being uniform and close in texture and of being sufficiently aerated to provide the desired amount of overrun before it may be considered perfect for sale and consumption.

Control of the barrel temperature is the more accurate the thinner the film of frozen confection adhering to the interior surface of the barrel. The correct mixing, homogenizing, whipping and aerating of the confection largely depends upon the correct control of the temperature during the treatment of the confection.

While numerous attempts have been made heretofore to construct mechanisms intended to produce the aforesaid effects, they involve rather complicated and cumbersome arrangements, often lacking in their intended efficiency, and, with few exceptions, being difficult to clean. Ready accessibility for the purpose of cleanliness is one of the essential requirements for devices of the kind indicated, wherein continuous operation is depended on to produce frozen confections from a confection mix entering in its liquid state at one end of the freezing barrel and being forcibly discharged in its frozen state at the other end thereof.

The present invention contemplates overcoming and does successfully overcome the disadvantages of heretofore known devices by the use of a very simple, inexpensive, readily accessible and readily cleansable, springless agitator construction which, as a result of its simplicity, is not only relatively inexpensive, but exceedingly effective as well.

One of the important objects of the present invention is the provision of an agitator shaft assembly for a freezing barrel and the like, employing a simple rotary shaft equipped with a plurality of individual, reciprocatingly mounted spirally curved elements so arranged that they may move bodily not only radially in respect to the longitudinal center axis of such shaft, but are adapted to rock upon the shaft.

A further object of this invention is to provide an agitator shaft for a freezing barrel and the like, wherein the shaft body is equipped between its journaled ends with a plurality of flat surfaces and which surfaces operatively support spiral elements so that they constitute a substantially continuous spiral formation about the shaft and are capable of a rocking motion for automatically positioning themselves with their individual spiral vane formations at the correct angle in respect to the interior barrel surface for thoroughly scraping any frozen matter adhering thereto.

A further object of the present invention is to so arrange the aforestated spiral elements that they are progressively offset relative to each other and that the ends of each two adjacent elements extend a substantial distance beyond one another, whereby uniformly spaced bypasses for the confectionery mass are provided for producing a combination whipping and aerating action to obtain the proper amount of overrun.

A more specific object of the present invention is the provision of a rotary agitating shaft for freezing barrels and the like in combination with a plurality of spiral scraper elements which are mounted reciprocatingly and radially in respect to the longitudinal center axis of the shaft, and which shaft is provided between its journaled ends with a body having flat faces extending the entire length thereof, the shaft body having either a square, oblong, triangular or substantially oval, flattened cross section, in short, a cross section other than a truly circular, and wherein from the flattened faces of the shaft body project radially guide means for such scraper elements, and wherein the elements are provided with means for relatively loosely accommodating such guide means so that the elements may not only move radially, such as outwardly to engage the inner periphery of the freezing barrel, but to be capable of a rocking motion, in respect to the flattened faces of the shaft, whereby their correct angular position relative to the interior face of the freezing barrel is determined.

Still another specific object of the present invention is the provision in a shaft construction as outlined above of a spiral element having a relatively thick-bodied base, curving cylindrically in outward direction and being provided with a flat bottom face adapted to cooperate with the flat face of the shaft, and from which body of the element extends a spiral fin of substantially a uniform cross section, the outer surface of which is substantially cylindrically curved to correspond with the cylindrical curvature of the interior face of the freezing barrel, and wherein that spiral fin extends over the entire length of the base, and wherein the ends of the base and the ends of the fin coincide with one another and are disposed in spaced planes normal to the longitudinal center axis of the base and of the shaft.

A still more specific object of the present invention is the provision, in conjunction with a freezing barrel, chamber or the like, having an inlet for receiving a confectionery mix at one end and a discharge means for the frozen product at the other end, of an agitating rotary shaft mounted within and journaled at the ends of the barrel, said shaft having a body portion of a square cross section between the journaled ends, and wherein a plurality of guide means in the form of pins, arranged in pairs, extend successively from the adjacent flat faces of the shaft body in the form of a spiral and in such a way that one pin of one pair extends beyond the nearest pin of the next adjacent pin pair, and with which pins are operatively associated spiral elements, each of the elements having a relatively heavy-bodied base with a cylindrically rounded exterior surface and a flat bottom face adapted to cooperate with one of the flat surfaces of the shaft and from which base extends a relatively lightweight, spiral fin or rib of substantially a uniform cross section, and in which base are provided spaced apertures for the reception and accommodation of a pair of corresponding guide pins, the apertures in the element base being of a sufficient dimension to provide a loose fit with the guide pins so as to facilitate movement of the elements not only in radial outward direction, but to also provide a slight rocking motion of the element in respect to the shaft, said apertures clearing the rib, said rib extending at both of its ends beyond the side edges of the element base body, and wherein said elements, thus operatively mounted upon the shaft are adapted to agitate, mix, whip and homogenize a confection mix contained in the freezing barrel and to scrape frozen mix from the interior face of the barrel or chamber and to convey the frozen product through the chamber and through its discharge to without.

Another important object of the present invention is the provision of an agitator shaft assembly provided with a plurality of spiral, interchangeable and readily replaceable combination scraping and agitating propeller elements, and wherein some of the elements are equipped with means for effecting increased aeration and whipping of the confectionery mix within a freezing barrel, and which means may take the shape of either projections extending from, or perforations transversing the vanes of the spiral elements, and which extensions or perforations may be of either uniform or graduated sizes.

The foregoing and numerous other important objects and additional advantages of the present invention will become more fully apparent from the ensuing description in conjunction with the accompanying drawings, and wherein:

Fig. 1 is a typical cross section through a freezing barrel containing an agitator shaft assembly in accordance with the present invention;

Fig. 2 is a section taken along line 2—2 through Fig. 1;

Fig. 3 is an enlarged top view of one of the preferred forms of a spiral scraper element;

Fig. 4 is a side elevation thereof;

Fig. 5 is an end view of the element shown in Figs. 3 and 4; and

Fig. 6 is an end view of a modified form of a scraper element.

In the drawings numeral 10 generally indicates a freezing barrel or chilling chamber composed of an outer shell 11 and an interior cylinder 12, which latter is provided with end covers 13 and 14 having, respectively, inlet and discharge means 13' and 14', and in which covers are provided end bearings 15 and 16 for journaling the cylindrical ends 17 and 18 of rotary agitator shaft 19. The body of the shaft between its journaled ends is of a substantially square cross section, which is the preferred form, although the shaft may have either an oblong, triangular or oval cross section, the latter with flattened faces, or a cross section of any other suitable geometrical figure, but preferably other than circular. Nevertheless even a circular cross section may come into consideration as will be explained hereinafter.

The flat faces of the square body portion of the shaft are indicated at 20, 21, 22 and 23 (consult Figs. 1 and 2). From these square faces of the shaft body extend radially in respect to the longitudinal center axis of the shaft studs or pins, arranged in pairs, and disposed along the shaft in the general order of a spiral. Each pair of pins may be considered as a unit composed of a first and a last pin. For the purpose of defining the location and relative position of the pin pairs, these pins are successively indicated, starting from the right-hand end of the shaft in Fig. 1, as follows: The first pin of the first pair is numbered 24, the last pin of the first pair is indicated at 24', numeral 25 denotes the first pin of the second pair, 25' indicates the last pin of the second pair, 26 the first pin of the third pair, 26' the last pin of the third pair, 27 the first pin of the fourth pair, 27' the last pin of the fourth pair, 28 the first pin of the fifth pair, 28 the last pin of the fifth pair, 29 the first pin of the sixth pair, 29' the last pin of the sixth pair, 30 the first pin of the seventh pair, 30' the last pin of the seventh pair, 31 the first pin of the eighth pair, and 31' the last pin of the eighth pair.

It will be observed from Figs. 1 and 2 that the first and fifth pin pairs extend from the top flat face 23, the second and the sixth pairs from the flat face 22, opposite face 20, the third and seventh pair from flat face 21, and the fourth and eighth pair from flat face 30. It will be also observed that every two adjacent pin pairs so-to-speak overlap one another, that is last pin 24' of the first pin pair extends beyond the position of first pin 25 of the second pin pair, pin 25' of the second pin pair extends beyond the position of pin 26 of the third pin pair, and so forth. In Fig. 1 a freezing barrel with only eight pin pairs is indicated. It is obvious, however, that, depending upon the required length of the freezing barrel and its corresponding shaft, more or less pin pairs may be provided.

All of the pins may be considered as guide means for a plurality of individual, bodily independent and interchangeable spirally shaped scraper elements 32 and 32' which are adapted to cooperate with the flat faces of shaft 19 and the interior surface of the barrel. Each of the spiral elements as shown in Figs. 2 to 5 have relatively large-bodied, elongated, substantially rectangular bases 33, which are bowed outwardly as at 33', see Fig. 5, and are provided with flat bottom faces 33'. Their parallel side edges 34 are adapted to substantially coincide with the respective edges of the shaft and their flat bottom faces are designed to cooperate with the respective flat shaft surfaces.

Projecting from body 33 of the elements are spiral fins, ribs or vanes 35, the end edges of which coincide with the end edges of element body 33 and are disposed in two spaced parallel planes as clearly indicated at 36 in Figs. 3 and 4.

In body 33 are provided apertures 37 which are located along the longitudinal center plane passing through the element. Apertures 37 are adapted for accommodating and operatively engaging the pins extending from shaft 19 and are of a sufficiently large interior diameter to provide a relatively loose fit in respect to the pins. That loose fit arrangement between the pins and the element apertures is of paramount importance since that construction facilitates not only the movement of the elements in radial direction relative to the longitudinal center axis of shaft 19, but also provides for a tilting or cantering motion of the elements in respect to the flat surfaces of the shaft body.

The barrel-engaging edges of spiral fins, ribs or vanes 35 are curved cylindrically as indicated at 38 in Fig. 5 so that their curvature corresponds to the interior curvature of barrel cylinder 12.

Again referring to Fig. 1, it will be seen that the vanes of the four spiral propeller elements 32' are provided with perforations 32''. The perforations of the first two elements at the right are preferably uniform in size, while the perforations in the next two elements gradually increase in size in left-hand direction, although the drawing does not show that. These perforations are adapted to produce an aerating action by causing the confection within the barrel to pass through these perforations concentrically in respect to the barrel.

From Fig. 1 it will be observed that the several spiral elements guided by their respective pairs of pins are so arranged that the ends of each two adjacent elements substantially extend beyond one another. It will be also observed from Figs. 3 and 5 that the end portions of spiral vanes 35 project substantially beyond the side edges 34 of base bodies 33. Thus the arrangement of the several elements, as mounted on the shaft, form a substantially continuous spiral structure about the shaft, and which spiral structure extends from one end of the shaft to its other end, except that where the end portions of two adjacent vanes overlap there is formed a break in the spiral which has its particular significance in the function, operation and the ultimate result produced by the agitating shaft, as will become evident under the heading "Operation."

The preferred construction of the individual spiral element is shown in Figs. 3, 4 and 5, disclosing a spiral rib or vane 35 of a substantially uniform, relatively thin-bodied structure, as compared with the bulky construction of base 33. The cylindrically curved outer edge of the spiral vane is relatively narrow.

A modified form of the spiral element 38 is indicated in end view in Fig. 6. There again a relatively thick-bodied base 39 is shown, from which extends a spiral rib or vane 40, which is much heavier than vane 35 of Fig. 5 and which possesses at its curved outer end an undercut or knife formation 41 which is intended as a scraping edge in cooperation with the interior surface of cylinder 12. It will be also observed that vane 40 is so shaped that its opposite end-formations are substantially symmetrical. The same symmetrical end construction of the vanes applies equally to the vane illustrated in Fig. 5. The purpose of such symmetry is to facilitate the use of the vane in any position upon the shaft pins, in other words, the vanes may be placed with either of the two ends forward or rearward, thus rendering all vanes of one type interchangeable. The modified form of the spiral propeller element 38 seen in Fig. 6 also has its vane provided with spaced projections 42.

Both the perforations 32'' in the vanes 32' seen at the right of Fig. 1 and projections 42 of vane 40 in Fig. 6 serve to effect a more vigorous whipping and aerating action by the elements for increasing the overrun of a confection, when desired.

Operation

A confectionery mix introduced into cylinder 12 at one end thereof, for instance, through an opening at the right hand cover, will be conveyed by the spiral elements through the cylinder and toward the opposite end and will be forced outwardly through suitable discharge means at that end, such as a spout which may form a part of the left hand cover. As the mix progresses through the cylinder, it is subjected to not only a freezing temperature, but also to a plurality of other treatments, such as mixing, whipping, bypassing and vigorous agitation, whereby the confectionery mix becomes thoroughly homogenized and aerated before it is discharged in its congealed or frozen state from the barrel.

The individual spiral elements are designed to execute three distinct movements and to serve, in conjunction with each other, four distinct purposes, first, their reciprocating movement in radial direction relative to the longitudinal center axis of the shaft, produces agitation, mixing and homogenizing of the confection; second, their cantering or tilting movement in respect to the flat surface of the shaft assures the correct scraping action; third, their rotation conveys matter from one to the other end of the barrel for discharge; and, fourth, their bypassing action of matter between the ends of each two adjacent elements provides aerating and thus the required overrun. The reciprocating action of the elements, in addition to the aforementioned purpose, also facilitates the whipping of a confectionery mix as it progresses from one end to the other of the device and becomes more and more congealed before its discharge from the latter end.

One of the outstanding functions of the present agitator assembly is the aforestated scraping action, whereby the frozen film, which would normally proportionately increase in the direction from the end at which the liquid confectionery mix is introduced toward the end at which the frozen mix is discharged, is uniformly, constantly and positively removed, while the device operates. The thorough and continuous scraping of the entire inner surface of cylinder 12 assures a very accurate control of the temperature to which the confectionery mass is subjected during treatment. It is a well-known fact that even a thin film of the frozen mass adhering to the interior surface of the cylinder materially affects the ultimate quality of the moving confectionery mass, and that only exact control prevents the formation of undesirable lumpiness of the finished product, for which reason, the superior structure of the present device is again emphasized.

When observing the device illustrated in Fig. 1, it will be noted that the inlet for the confectionery mix is located at the right end of the freezing barrel, while the discharge spout is located at the left end thereof. The agitating shaft assembly is designed to convey the mix through the barrel in the direction from the inlet end toward the discharge end. The mix enters the barrell in substantially a liquid state at approximately the temperature of the surrounding atmosphere, but as it is forcibly moved through the cold freezing barrel toward the discharge spout, the consistency of the mix progressively changes as the mass congeals.

Depending upon the cooling efficiency of the freezing barrel and upon the temperature at which it operates, the solidification of the mix may take place either within the second third or the second half of the barrel's length. Therefore in order to provide the final, congealed product with the desired amount of overrun, aeration of the mix must take place within that portion of the freezing barrel in which the confection is still in a sufficiently fluid state to allow effective incorporation of air, that is within either the first third or the first half of the freezing barrel, considered from the inlet end thereof.

Within these barrel portions the bodily movement of the spiral propeller elements both in radial direction as well as in a rocking fashion in respect to the shaft is quite unrestricted, whereby agitation, whipping and aeration of the mix is rendered most effective. As the confection solidifies, the movements of the elements become progressively restricted until they are finally stopped in a cantered, barrel-scraping position.

Modified operation

For the purpose of effecting any desired amount of overrun in a treated confection it is proposed to employ near the inlet end of the barrel spiral elements provided with suitable means whereby faster and more generous aeration and whipping of the confection is produced. Such means are in the form of either spaced projections or enlargements, as shown in Fig. 6, or spaced apertures transversing the vanes, as at the right of Fig. 1. As stated, such projections or apertures may be either of a uniform size, but preferably increase in size in the direction from the barrel inlet toward the outlet spout.

Inasmuch as all spiral propeller elements are readily interchangeable, a switch from elements having smooth vanes to elements having vanes with perforations or projections is greatly facilitated.

Depending upon the amount of overrun desired, one, two, three or four elements providing greater whipping and aerating action may be substituted at the inlet end of the barrel for propeller elements having smooth vanes.

Cleaning

Due to the extreme simplicity of the agitating shaft and its readily removable interchangeable scraper elements, and due to the fact that both heads or covers are removably associated with the freezing barrel, the cleaning of the entire device is readily facilitated. Thus, when the covers are removed, the removal of the agitator assembly becomes very simple, and the interior of the cylinder may be flushed and sterilized, and the shaft as well as each one of its pins, the elements and their pin apertures and aerating means may be individually cleansed. Moreover the reassembly of the agitator shaft is greatly facilitated, since the elements are interchangeable.

As stated above, the shaft of the agitator assembly has preferably a square cross section along its body between its two journaled ends, but its shape may be different, such as triangular, oblong and even circular. When a cylindrical shaft is employed, the bottom faces of the element are curved to correspond to the cylindrical shape of the shaft, but in every other respect their function and operation and that of the entire agitator assembly remains the same as described in connection with the shaft having the square cross section.

All of the aforementioned features of the present device clearly indicate the simplicity and relative inexpensiveness of the structure as well as its practicability and effectiveness in its function. While only one specific embodiment of the device is indicated, it is quite obvious that for apparatus of either greater or shorter length or of larger or smaller barrel diameters, changes and improvements may have to be incorporated, such changes and improvements residing within the broad scope of this invention as defined in the annexed claims. What is claimed as new is:

1. In a device for making frozen confectionery products in a continuous process and including a relatively spacious cylindrical freezing chamber having an inlet for receiving a confectionery mix at one end and discharge means for the frozen product at the other end, a rotary shaft within the chamber and journaled with its ends at the chamber's ends, the body of the shaft between its journaled ends having a cross section other than that of a cylinder, and which shaft cross section is substantially smaller than that of the chamber, a plurality of guide means extending from the shaft body and being disposed radially in respect to the longitudinal axis of the shaft, a plurality of independent, bodily interchangeable, spirally curved scraper elements progressively offset relative to one another along substantially a continuous spiral so that the ends of each two adjacent elements extend a considerable distance beyond one another, said elements being reciprocatingly mounted upon said guide means and being adapted for individual, bodily movements in substantially radial direction in respect to the longitudinal shaft axis and to thereby agitate, whip and homogenize the mix entering the chamber, scrape frozen mix from the interior face of the chamber and convey the frozen product through the chamber and the latter's discharge means.

2. In a device for making frozen confectionery products in a continuous process, said device including a freezing barrel having inlet means at one end for the reception of a confectionery mix and discharge means at the other end for the frozen, treated mix, a rotary shaft of a substantially lesser cross section than that of the barrel arranged coaxially with said barrel and being journaled with its ends at the ends of said barrel, the shaft body between its journaled ends having flat, axially extending surfaces, a plurality of fixed guide means, arranged in groups and projecting from these flat shaft surfaces radially in respect to the longitudinal shaft axis, an individual, spirally curved scraper element progressively offset relative to one another to produce substantially a continuous spiral, and being reciprocatingly mounted with each group of said guide means so that the end of one element extends a considerable distance beyond the end of the next element, said elements being interchangeable and bodily movable radially either toward or away from the longitudinal center axis of the shaft and being adapted by their individual bodily movement to agitate, whip and homogenize the freezing mix, to scrape frozen mix from the interior barrel surface and to convey the finished product through the barrel and the latter's discharge means.

3. In a device as per claim 2, said shaft body having a substantially square cross section, whereby four flat surfaces are provided, said guide means constituting pins, the grouping of the pins being in pairs, each pin pair comprising a first and a second pin, considered in relation to one and to the other end of the shaft, respectively; the arrangement of the pin pairs being such that, starting from that one shaft end, the first pin pair projects from one of the shaft surfaces, the second pair projects from the immediately adjacent second shaft surface so that its first pin is closer to that one shaft end than the second pin of the first pin pair; the third pin pair projecting from the third shaft surface adjacent to the second surface so that its first pin is closer to that one shaft end than the second pin of the second pin pair; the fourth pin pair projecting from the fourth shaft surface adjacent to the third and first shaft surfaces so that its first pin is closer to that one shaft end than the second pin of that third pin pair; the fifth pin pair projecting from the first shaft surface so that its first pin is closer to that one shaft end than the second pin of the fourth pin pair; the sixth, seventh and eighth pin pairs corresponding in position and interrelation to each other to the second, third and fourth pin pairs.

4. In an apparatus for producing frozen confections by a continuous process, said apparatus including a freezing barrel having inlet and outlet means at opposite ends for receiving a confection mix and for discharging frozen confection, respectively; a rotary shaft coaxial with the barrel and substantially smaller in cross section than the latter, and being journaled with its ends at the barrel ends, the outer shaft surface consisting of a plurality of axially arranged flat faces between its journaled ends, a plurality of independent, interchangeable, individually and bodily movable cooperating mixing, whipping and conveying elements reciprocatingly and radially mounted in respect to said shaft faces, with at least two elements for each shaft face, and being adapted to engage the interior barrel surface for scraping frozen matter therefrom, said elements being progressively offset relative to one another to constitute substantially a continuous spiral formation about the shaft and so that the ends of one element extend a substantial distance beyond the ends of its adjacent elements.

5. In an apparatus for producing frozen confections by a continuous process, said apparatus including a freezing barrel having inlet and outlet means at opposite ends for receiving a confection mix and for discharging frozen confection, respectively; a rotary shaft coaxial with the barrel and journaled with its ends at the barrel ends, the cross section of the shaft being substantially smaller than that of the barrel, the outer surface of the shaft being composed of a plurality of axially arranged flat faces between its journaled ends, a plurality of independent, interchangeable and cooperating mixing, whipping and conveying spirally curved elements operatively mounted in respect to each of said shaft faces and being adapted to both reciprocate in radial direction relative to the longitudinal shaft axis and to said shaft faces, and to also simultaneously tilt in respect to said shaft faces, and being further adapted, when moved to their outermost position, to forcibly engage the interior barrel surface for scraping frozen matter from the latter, said elements being disposed to constitute a substantially continuous spiral about the shaft and so that the ends of each two adjacent elements extend a substantial distance beyond one another.

6. In an apparatus as per claim 5, a plurality of guide members for said elements fixedly associated with the shaft and extending from said shaft faces, said elements having apertures for the reception of said guide members, the body dimensions of said guide members being less than the interior dimensions of said element apertures whereby reciprocating and tilting motions of the elements are facilitated.

7. In an apparatus as per claim 5, a plurality of guide members for said elements, arranged in pairs, fixedly secured to the shaft and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated.

8. In an apparatus as per claim 5, a plurality of guide members for said elements, arranged in pairs, fixedly secured to the shaft and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated; said elements constituting fragmental, one-directional spiral structures so supported by said guide members that the ends of each two successive elements extend beyond one another, whereby a substantially continuous feeding spiral along the entire length of the shaft body is formed.

9. In an apparatus as per claim 5, a plurality of guide members for said elements, arranged in pairs, fixedly associated with the shaft and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated; said elements constituting fragmental, one-directional spiral structures, each element comprising a base having a flat bottom face, adapted to co-act with one of the shaft faces, and a spiral rib extending along the entire length of the base.

10. In an apparatus as per claim 5, plurality of guide members for said elements arranged in pairs and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated; said elements constituting fragmental, one-directional spiral units, each unit comprising a base with an outwardly bowed body and a flat bottom face, the latter being adapted to cooperate with one of the shaft faces, a spiral rib of a uniform cross section projecting from the body along the latter's entire length, each end of the rib and each corresponding end of the base being disposed in a single plane, the end planes being normal to the length axis of the base.

11. In an apparatus as per claim 5, a plurality of guide members for said elements arranged in pairs and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated; said elements constituting fragmental, one-directional spiral units, each unit comprising a base with an outwardly bowed body and a flat bottom face, the latter being adapted to cooperate with one of the shaft faces, a spiral rib of a uniform cross section projecting from the body along the latter's entire length, each end of the rib and each corresponding end of the base being disposed in a single plane, the end planes being normal to the length axis of the base, said apertures for accommodating said guide members being arranged in the body of the base and clearing said rib.

12. In an apparatus as per claim 5, a plurality of guide members for said elements arranged in pairs and extending from successively adjacent shaft faces in substantially a spiral order along the entire shaft body and so that one pair overlaps the next successive pair, each of said elements having pairs of apertures for loosely accommodating said guide members, whereby reciprocating and tilting motions of the elements are facilitated; said elements constituting fragmental, one-directional spiral units, each unit comprising a base with an outwardly bowed body and a flat bottom face, the latter being adapted to cooperate with one of the shaft faces, a spiral rib of a uniform cross section projecting from the body along the latter's entire length, said rib being relatively thin, as compared with the body of the base, the ends of the rib coinciding with the ends of the base and being disposed in parallel planes normal to the length axis of the base, the end portions of the rib extending beyond the side edges of the base and clearing said apertures for accommodating said guide members.

13. In a rotary shaft construction for freezing barrels and the like, a shaft structure of substantially square cross section having cylindrical ends adapted to be journaled at the ends of such freezing barrel, a plurality of spirally arranged pairs of pins extending from the flat shaft faces so that one pair overlaps the next adjacent pair; individual, bodily interchangeable, one-directionally spirally curved elements having pin-accommodating apertures operatively mounted with each pin pair so that the ends of each two adjacent elements extend beyond one another, there being at least two spiral elements operatively associated with each of the shaft faces and being so spaced that at least three elements, one for each of the other shaft faces, find accommodation along the distance separating these two first-mentioned elements.

14. In a rotary shaft construction as per claim 13, said spirally curved elements being adapted for engagement with the interior surface of such freezing barrel to facilitate the scraping therefrom of frozen matter, and being further adapted to mix and whip matter in such barrel and to convey it from one to the other end of such barrel, each of said elements comprising a base having a circularly rounded body portion and a flat bottom face, the latter cooperating with one of the flat faces of the shaft, a relatively narrow spiral rib extending from the base along its entire length and having a uniform cross section and a cylindrically curved outer face substantially corresponding to the interior surface of such barrel; said pin-accommodating apertures clearing said rib and being sufficiently spacious to loosely engage its corresponding pin pair, thereby facilitating a rocking motion of the element in respect to the shaft.

15. The combination with a multiple faced rotary shaft of square cross section for freezing barrels and the like, of a plurality of individual, bodily interchangeable spirally shaped elements radially mounted in respect to the longitudinal shaft axis and being adapted for a reciprocating motion relative to the several shaft faces and forming a substantially continuous spiral formation about the shaft.

16. The combination with a multiple faced rotary shaft of square cross section for freezing barrels and the like, of a plurality of individual, bodily independent and interchangeable spirally shaped elements reciprocatingly mounted upon the several shaft faces and being movable radially in respect to the longitudinal shaft axis and forming a substantially continuous spiral about the shaft, the ends of each two adjacent spiral elements overlapping one another.

17. The combination with a multifaced rotary shaft of square cross section for freezing barrels and the like, of a plurality of individual, bodily interchangeable, spirally curved elements reciprocatingly mounted in spaced pairs upon the several shaft faces and being movable radially in respect to the longitudinal shaft axis and forming a substantially continuous spiral about the shaft, the ends of each two adjacent spiral elements overlapping one another, the mounting of the elements upon the shaft being sufficiently free to facilitate a rocking motion of the elements relative to the shaft.

18. In an agitator assembly for freezing barrels, a shaft having a cross section substantially smaller than that of the barrel and having flat faces, guide means radially extending from the flat faces of and fixedly secured to the shaft, a plurality of independent, bodily interchangeable spirally curved propeller elements provided with apertures for the reception of and being in operative engagement with said guide means and being adapted for a combination radial reciprocating and a cantering motion in respect to the flat faces of the shaft.

19. In an agitator assembly as per claim 18, said elements being arranged to form a substantially continuous spiral structure about the shaft and so that the ends of each two adjacent elements extend beyond one another.

20. In an agitator assembly as per claim 18, and wherein some of the spiral propeller elements are provided with means for inducing aeration of confection treated in the barrel.

21. In an agitator assembly as per claim 18, and wherein the vanes of some of the elements are provided with perforations through their bodies to effect concentric passages for matter within the freezing barrel.

22. In an agitator assembly as per claim 18, and wherein the vanes of some of the elements are provided with perforations increasing in size from one end of the barrel toward its other end to effect concentric, progressively enlarging passages for matter within the freezing barrel.

THOMAS CARVEL.

REFERENCES CITED

The following references are of record in the file of this patent:

UNITED STATES PATENTS

| Number | Name | Date |
|---|---|---|
| 1,954,146 | Schultz | Apr. 10, 1934 |
| 2,023,607 | Miller | Dec. 10, 1935 |
| 2,036,217 | Jordan | Apr. 7, 1936 |
| 2,063,065 | Vogt et al. | Dec. 8, 1936 |
| 2,306,602 | Harrington | Dec. 29, 1942 |
| 2,402,931 | Thomas | Jan. 25, 1946 |